United States Patent [19]

Matsuoka

[11] Patent Number: 5,074,581
[45] Date of Patent: Dec. 24, 1991

[54] VEHICLE SUSPENSION SYSTEM USING A ROTARY DAMPEN

[75] Inventor: Yoshinori Matsuoka, Saitama, Japan

[73] Assignee: Honda Giken Kogyo Kabushiki Kaisha, Tokyo, Japan

[21] Appl. No.: 524,770

[22] Filed: May 17, 1990

[30] Foreign Application Priority Data

May 19, 1989 [JP] Japan ................. 1-126416
May 19, 1989 [JP] Japan ................. 1-126417

[51] Int. Cl.$^5$ ............................................. B60G 15/06
[52] U.S. Cl. ................................... 280/695; 280/700; 267/217
[58] Field of Search ............. 280/695, 700, 721, 723, 280/690, 673; 267/191, 217, 273, 154, 195

[56] References Cited

U.S. PATENT DOCUMENTS

| | | | |
|---|---|---|---|
| 1,926,800 | 9/1933 | Casper | 267/217 |
| 2,106,886 | 2/1938 | Chisholm | 280/191 |
| 2,137,848 | 11/1938 | Macbeth | 280/295 |
| 4,913,255 | 4/1990 | Takayanagi et al. | 267/217 |
| 5,005,859 | 4/1991 | Satoh | 280/91 |

FOREIGN PATENT DOCUMENTS 56-122842 9/1981 Japan.
57-191112 11/1982 Japan.
58-55923 12/1983 Japan.

Primary Examiner—Kenneth R. Rice
Assistant Examiner—Karin Tyson
Attorney, Agent, or Firm—Armstrong, Nikaido, Marmelstein, Kubovcik & Murray

[57] ABSTRACT

A rotary damper is provided in a base end of a swing arm forming a part of a vehicle suspension system. The rotary damper comprises a casing defining a fluid chamber having a shape of a fan extending substantially toward a free end of the swing arm in cross section as seen in a plane perpendicular to a longitudinal line of the pivot center line, a central shaft centrally received in the casing, and a single vane extending laterally from the central shaft into the fluid chamber, the fluid chamber being filled with fluid for applying a damping force to the vane as the vane relatively moves in the fluid chamber. By thus eliminating the need for a tubular damper, the space efficiency can be improved, and reduction in the overall size and weight of the system can be improved with the added advantage of allowing avoidance of interference with the drive shaft of the wheel in a simple manner.

7 Claims, 8 Drawing Sheets

VEHICLE SUSPENSION SYSTEM USING A ROTARY DAMPEN

TECHNICAL FIELD

The present invention relates to a vehicle suspension system using a rotary damper, and in particular to such a suspension system which is highly compact and allows much freedom in vehicle body design.

BACKGROUND OF THE INVENTION

In the wishbone type suspension system, a pair of planar swing link arms are disposed in a vertically spaced manner, and a suspension coil spring and a tubular damper are mounted between the lower swing arm and the vehicle body as a shock absorber. Therefore, the wishbone suspension system is known to have the problems that it is complex in structure, heavy, expensive and poor in space efficiency as compared with the strut type and other suspension systems. In particular, when it is used on a front wheel of front drive vehicle, it is necessary to place the damper above the drive shaft or offset therefrom along the fore-and-aft direction so as not to interfere with the drive shaft.

Therefore, Japanese utility model laid open publication No. 56-122842 discloses a double wishbone suspension system which makes use of a torsion bar and a rotary damper instead of a coil spring and a tubular damper. However, since the torsion bar is directly mounted on the rotary damper, it is difficult to achieve a necessary sealing arrangement in the damper against the twisting deformation of the torsion bar. Furthermore, since the link moving vertically with the vertical movement of the wheel and the rotary damper are connected to each other via the torsion bar, the angular displacement of the rotary damper becomes smaller than the swing angle of the link arm. Therefore, the damper must be increased in size in order to obtain a sufficient damping force, and must extend under the torsion bar to such an extent that the height of the vehicle bottom from the road surface becomes unacceptably small.

As an alternate type of suspension system, there is the strut type suspension system which includes a strut unit integrally formed with a steering knuckle generally consisting of a strut incorporating a tubular damper, and a suspension coil spring surrounding the strut. Since the strut unit is subjected to bending forces arising from brake torque and drive torque as well as those arising from lateral forces during cornering manoeuvers, and such bending forces give rise to frictional forces, it is necessary to increase the diameters of the strut and the piston rod of the damper in order to ensure a sufficient rigidity and achieve a desired sealing performance inside the strut.

Therefore, a conventional strut unit is disposed so as to extend inwardly of the vehicle body in order to avoid interference between the damper and coil spring and the wheel. This not only restricts the space in the engine room or the passenger compartment but also prevents reduction in cost due to the complexity of the structure and the need for a large number of component parts. Further, since the strut unit must be relatively heavy, the overall weight of the suspension system is necessarily large, and its center of gravity tends to be high. Moreover, in order to secure a large effective stroke of the damper, the length of the strut unit is increased, and this imposes a severe restriction on the freedom of vehicle body design, particularly because of the increased height of the bonnet line above the front wheel.

In view of this fact, the applicant of the present application actually put into use a strut type suspension system using a torsion bar instead of a coil spring, as disclosed in Japanese patent laid open publication No. 57-191112. There are other previously proposed suspension systems using rotary dampers instead of tubular dampers, as disclosed in Japanese utility model laid open publication No. 56-122842 and Japanese patent publication No. 58-55923.

BRIEF SUMMARY OF THE INVENTION

In view of such problems of the prior art, a primary object of the present invention is to provide a vehicle suspension system, for instance a double wishbone suspension system, which permits its structure to be simplified and reduced in both size and weight for better space efficiency.

A second object of the present invention is to provide a vehicle suspension system which allows freedom in vehicle body design to be increased through elimination of interference with the drive shaft for the wheel by an extremely simple measure.

A third object of the present invention is to provide a strut type vehicle suspension system which permits the structure of its strut unit to be simplified and reduced in both size and weight, its manufacturing cost to be reduced through reduction in the number of component parts.

These and other objects of the present invention can be accomplished by providing a vehicle suspension system, comprising: a suspension link mechanism including a swing arm pivotally supported by a part of a vehicle body at its base end and pivotally connected to a wheel carrier at its free end; spring means elastically supporting the swing arm relative to the vehicle body; and a rotary damper provided in the base end of the swing arm coaxially with a pivot center line of the base end of the swing arm to produce a damping force resisting a vertical swinging movement of the swing arm; the rotary damper comprising a casing defining a fluid chamber having a shape of a fan extending substantially toward a free end of the swing arm in cross section as seen in a plane perpendicular to a longitudinal line of the pivot center line, a central shaft centrally received in the casing, and a single vane extending laterally from the central shaft into the fluid chamber, the fluid chamber being filled with fluid for applying a damping force to the vane as the vane relatively moves in the fluid chamber.

By thus eliminating the need for a tubular damper, space efficiency can be improved, and reduction in the overall size and weight of the system can be reduced with the added advantage of allowing avoidance of interference with a drive shaft in a simple manner.

According to a structurally advantageous embodiment of the present invention, the central shaft is fixedly secured to the vehicle body and extends centrally through the pivot center of the base end of the swing arm while the casing is formed in the base end of the swing arm. To reduce space requirements even further, the central shaft may consist of a hollow shaft, and the spring means may comprise a torsion bar extending through the hollow shaft and connected to the base end of the swing arm at its one end and to the vehicle body at its other end.

This structure may be applied to a double wishbone suspension system. Preferably, the link mechanism comprises a pair of swing arms which are vertically spaced from each other and extending substantially laterally of the vehicle body, and the rotary damper is provided in the base end of the upper swing arm. This allows a larger clearance between the bottom contour of the suspension system and the road surface. Since the upper arm is typically shorter than the lower swing arm in the wishbone suspension system, and the shorter swing arm undergoes a larger angular displacement than the longer swing arm for a given vertical displacement of the wheel, a substantially large damping force may be produced by thus providing a rotary damper to the upper swing arm.

To achieve a desired rigidity of the suspension system, and achieve a solid support for the rotary damper, the swing arm equipped with the rotary damper may be pivotally mounted on the vehicle body at two points which are spaced along a longitudinal direction of the pivot center line of the swing arm.

When the present invention is applied to the lower swing arm of a strut type suspension system, the strut unit may consist solely of telescopic guide means, and the strut unit may be reduced in size, and a substantial saving of space can be achieved. By thus constructing the strut unit solely by a guide mechanism without incorporating shock absorber elements such as a damper and a coil spring, no sealing considerations are required for the interior of the strut, and the strut can be reduced in both size and weight while ensuring a sufficient rigidity against bending forces.

According to yet another alternate embodiment of the present invention, the swing arm consists of a trailing arm having a pivot center extending at an angle to a fore-and-aft direction of the vehicle body.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
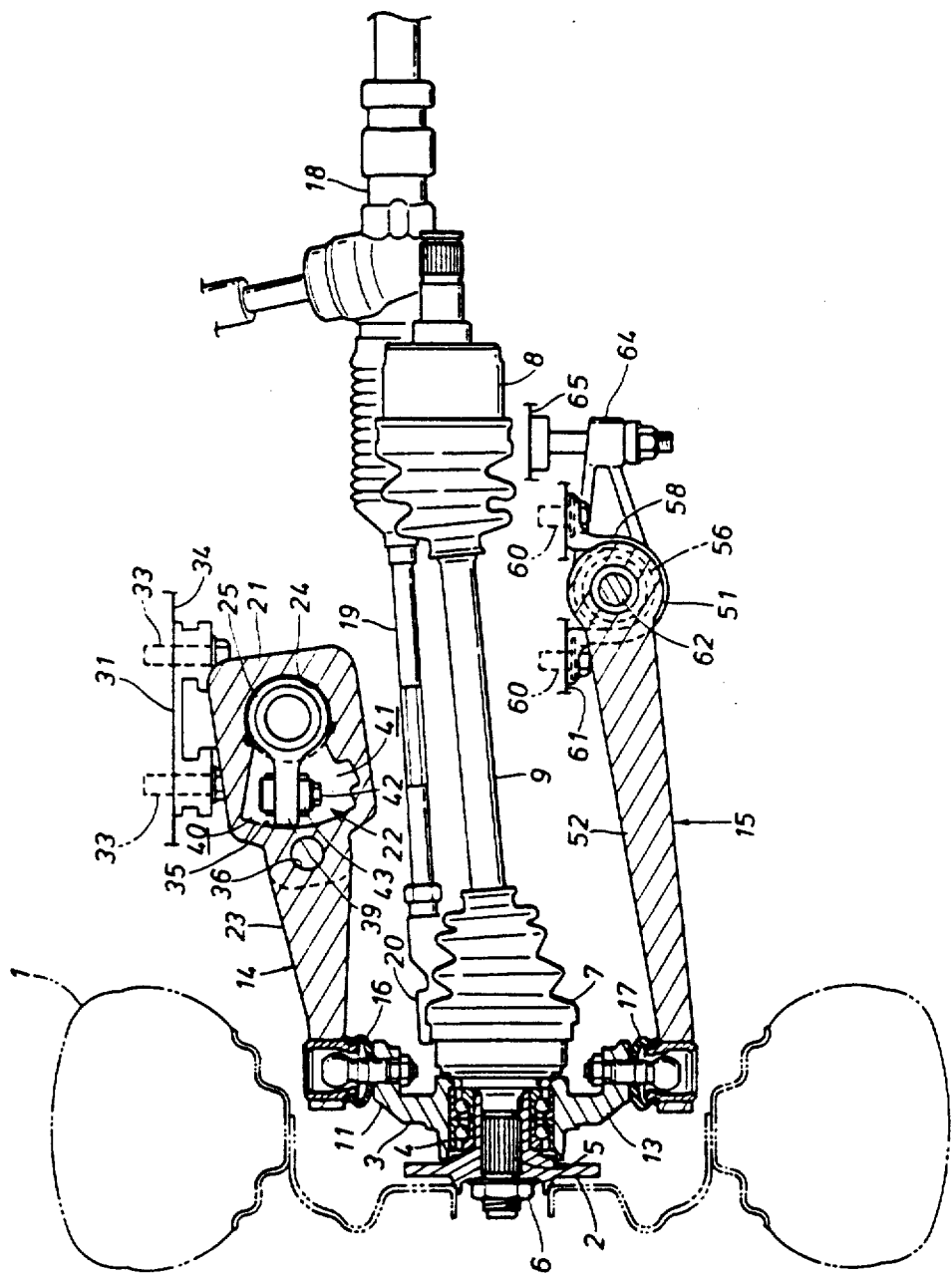
FIG. 1 is a sectional front view of a first embodiment of the suspension system according to the present invention as applied to a double wishbone type suspension system.
Figure 2:
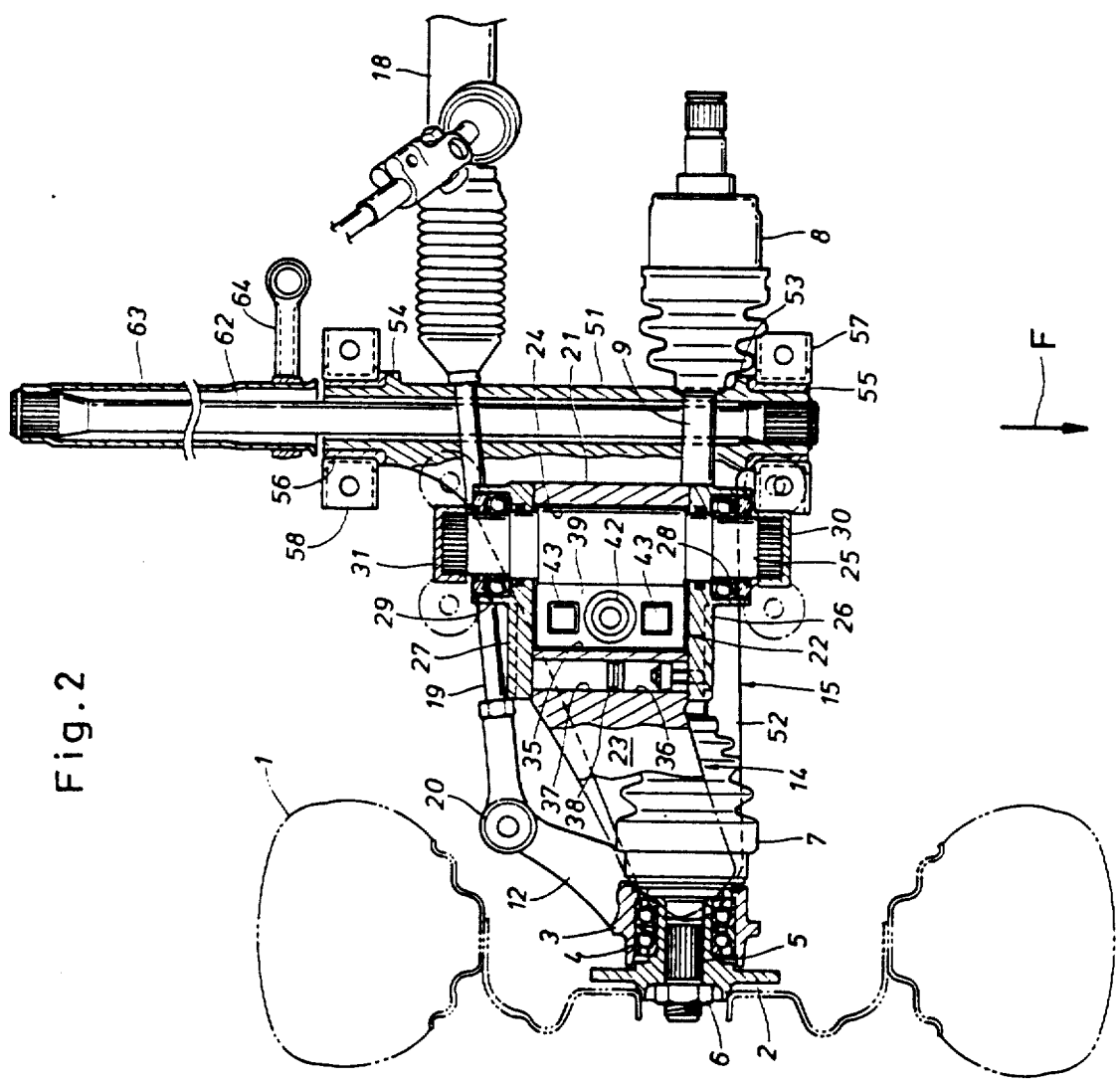
FIG. 2 is a sectional plan view of the first embodiment.
Figure 3:
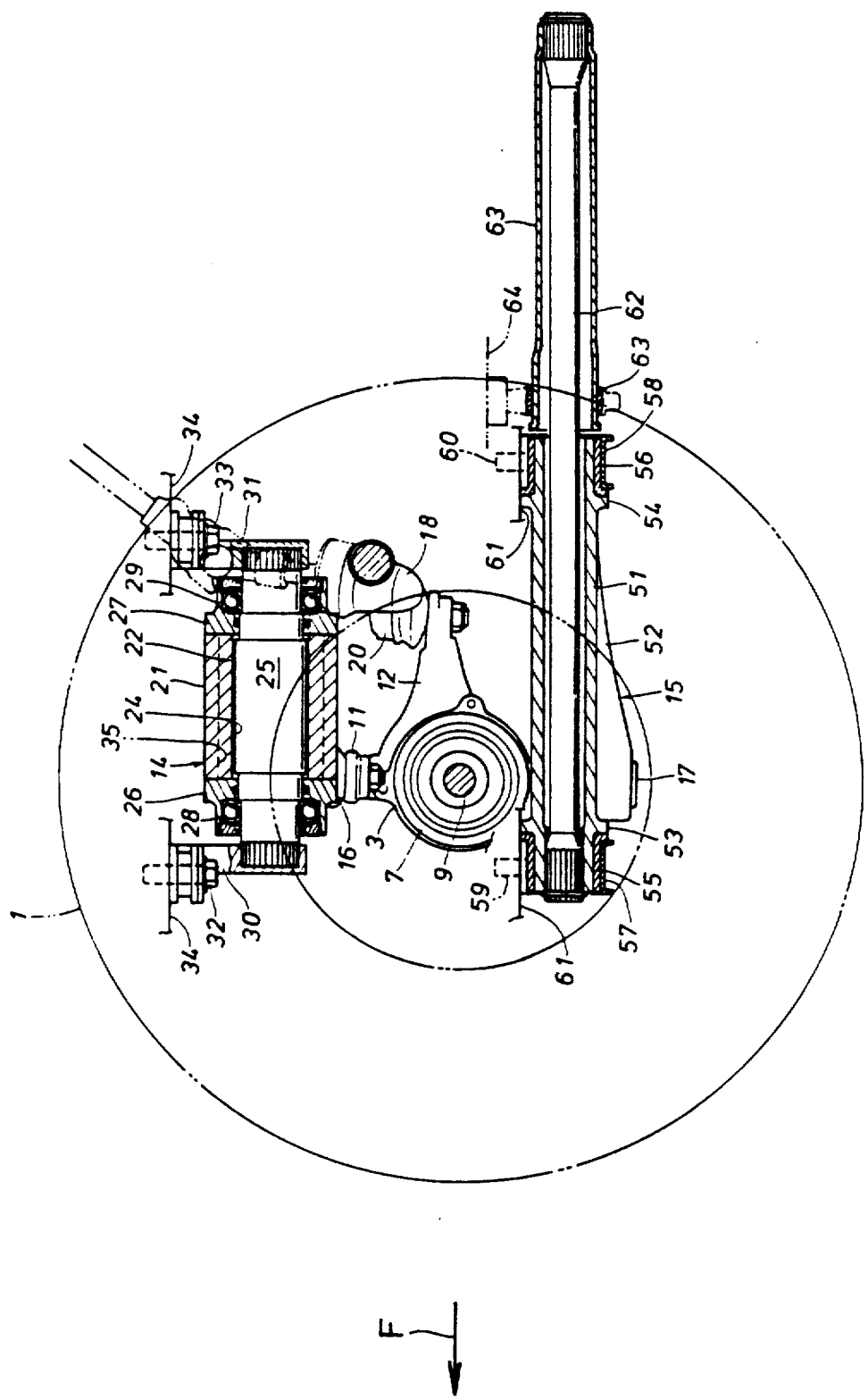
FIG. 3 is a sectional side view of the first embodiment.

FIGS. 1 through 3 show a double wishbone type suspension system for a right front wheel of a front drive vehicle given here as an example of an application of the present invention. In these and other drawings, the direction of the forward movement of the vehicle is indicated by the arrow F. The hub 2 of the wheel 1 is rotatably supported in a central part of a knuckle 3 by means of a bearing 4, and an axle 5 is secured by a nut 6 in the center of the hub 2 for integral rotation therewith by means of serration. The axle 5 is connected to an engine via universal joints 7 and 8, and a drive shaft 9.

The knuckle 3 is provided with three arms 11 through 13 extending upward, downward and rearward, respectively, and curving inwardly as required so as not to interfere with the front wheel 1. To the free ends of the upper arm 11 and the lower arm 12 are connected the free ends of a pair of upper and lower swing arms 14 and 15, respectively, via ball joints 16 and 17. The free end of the horizontal arm 12 is pivotally connected to the free end of a tie rod 19 extending from a steering gear box 18 by way of a ball joint 20 as well known in the art. The upper and lower swing arms 14 and 15 are vertically spaced from each other in a parallel relationship. In the present embodiment, they have different lengths, and the upper arm 14 is shorter than the lower arm 15 as seen along the lateral direction of the vehicle.

The upper arm is pivotally supported by the vehicle body at its base end 21 so as to be able to swing vertically. The base end 21 incorporates a hydraulic rotary damper 22 therein. A main part or a swing portion 23 of the upper arm 14 is formed as a relatively wide horizontal plate extending rearwards in an oblique fashion from its free end pivotally connected to the upper arm 11 to its base end 21 pivotally connected to the vehicle body as best shown in FIG. 2.

The base end 21 is provided with a circular bore 24 extending along the fore-and-aft direction of the vehicle body, and a hollow shaft 25 of a substantially same diameter is rotatably received in this circular bore 24 in a relative sense. End plates 26 and 27 are attached to the longitudinal ends of the base end 21, and the base end 21 is rotatably supported by the hollow shaft 25 by way of bearings 28 and 29 mounted to the end plates 26 and 27, respectively, at two points which are spaced from each other along the fore-and-aft direction of the vehicle. The hollow shaft 25 is connected, by means of serration, to support members 30 and 31 at its longitudinal ends projecting out of the end plates 26 and 27, respectively, and the support members 30 and 31 are fixedly secured to the vehicle body 34 by bolts 32 and 33, respectively. Thereby, the upper arm 14 can pivot vertically about the hollow shaft 25 as the wheel 1 moves vertically. It is also possible to rotatably support the base end 21 on the hollow shaft 25 by way of rubber bushes or the like instead of the bearings 28 and 29.

The rotary damper 22 is provided with an oil chamber 35 having the shape of a fan concentric to the circular bore 24 provided in the swing portion 23 side of the base end 21 in cross section. The oil chamber 35 is enclosed by the end plates 26 and 27 in a liquid tight manner, and its interior is filled with noncompressible oil such as silicone oil. The interfaces between the hollow shaft 32 and the end plates 33 and 34 are also sealed in a liquid tight manner. The base end 21 is internally provided with a reserve chamber 36 next to the oil chamber 35, and the reserve chamber 36 is separated from a gas chamber 37 filled with nitrogen gas or the like by a free piston 38 on the one hand, and communicated with the oil chamber 35 by a passage not shown in the drawings.

The hollow shaft 25 is integrally provided with a single vane 39 which extends horizontally from one side thereof to the interior of the oil chamber 35 and separates the oil chamber 35 into an upper chamber 40 and a lower chamber 41. The vane 39 is centrally provided with a valve 42 selectively communicating the upper chamber 40 with the lower chamber 41; this valve 42 opens itself according to the pressures of the two chambers 40 and 41. Further, the vane 39 is provided with a pair of rubber stoppers 43.

The lower arm 15 is pivotally supported by the vehicle body at its base end 51 so as to be able to swing vertically. This base end 51 is provided with the shape of a relatively elongated cylinder extending along the fore-and-aft direction of the vehicle body. A main part or a swing portion 52 of the lower arm 15 is formed as a triangular plate member extending from its free end connected to the lower arm 13 to its base end 51.

The outer periphery of the base end 51 is provided with flanges 53 and 54 at its either longitudinal end, and a pair of sleeves 55 and 56 are fitted thereon in front of and behind the flanges 53 and 54, respectively, in a freely rotatable manner in a relative sense. The sleeves 55 and 56 are retained in grooves defined by U-shaped support members 57 and 58, and are fixedly secured to the vehicle body by threaded bolts 59 and 60. Thereby, the lower arm 15 can swing vertically about the base end 51, along with the upper arm 14, as the wheel 1 moves vertically.

An elongated torsion bar 62 extending along the fore-and-aft direction of the vehicle body is passed through the interior of the base end 51. The front end of the torsion bar 62 is connected to the front end of the base end 51 by spline. A rear end portion of the torsion bar 62 extends rearwards out of the rear end of the base end 51, and is loosely received by a torsion tube 63. The torsion tube 63 is connected, by serration, to the rear end of the torsion bar 62 at its rear end, and is fixedly secured to the vehicle body 65 by an anchor member 64 at its front end. Therefore, the torsion bar 62 and the torsion tube 63 can undergo a twisting deformation around their axial line, thereby allowing the wheel 1 to be elastically supported by the lower arm 15.

In this way, by providing a torsion bar 62 to the base end 51 of the lower arm 15, and mounting a rotary damper 22 to the base end 21 of the upper arm 14, the height of the bottom of the vehicle from the ground surface can be easily secured. Further, since the upper arm 14 is shorter than the lower arm 15 as mentioned above, the swing angle of the upper arm 14 is larger than the swing angle of the lower arm 15. Because the relative angular displacement of the vane 39 in the oil chamber 35 is thus larger than the twisting angle of the torsion bar 62, the relatively small rotary damper 22 can provide an adequate damping force.

Now the operation of the suspension system according to the present invention described above is described in the following. As the vehicle travels over an irregular road surface, the wheel 1 can move up and down by virtue of the link mechanism including the two swing arms 14 and 15 according to the irregularities of the road surface. As the lower arm 15 moves vertically around its base end 51, the torsion bar 62 and the torsion tube 63 are twisted, and this twisting deformation allows elastic support of the vehicle body relative to the wheel 1.

Also, as the upper arm 14 pivots vertically around the hollow shaft 25, the vane 39 moves vertically in the oil chamber 35 in a relative sense. For instance, as the wheel moves upward, the lower chamber 41 is compressed, and the oil in the lower chamber 41 flows into the upper chamber 40 by passing through the gap between the inner circumferential surface of the oil chamber 35 and the vane 39. Further, once the pressure in the lower chamber 41 rises beyond a certain level, the valve 42 opens, and the oil flows from the lower chamber 41 into the upper chamber 40. The resistance to the flow of oil through this gap and the resistance due to the valve 42 produce a damping force. Conversely, as the wheel 1 moves downward, the upper chamber 40 is compressed, and the oil of the upper chamber 40 flows into the lower chamber 41. This likewise produces a damping force.

The scope of the present invention is not limited by the above described embodiment, and the present invention can be applied equally to the front and rear wheels of front drive and rear drive vehicles, irrespective of whether they are steerable or not, and whether they are driven or not. Further, other conventional types of rotary dampers and torsion bars can be used instead of those mentioned above.

Thus, according to the present embodiment, since a torsion bar is connected to the swing center shaft of a lower arm, and a rotary arm is mounted on a pivot point of the upper arm which is shorter than the lower arm, the structure of the overall system can be simplified, and its weight and size can be reduced, thereby allowing a significant improvement in space efficiency. In particular, when this system is applied to a front wheel of a front drive vehicle, interference with the front wheel can be easily avoided, and freedom in vehicle body design can be improved.

Figure 4:
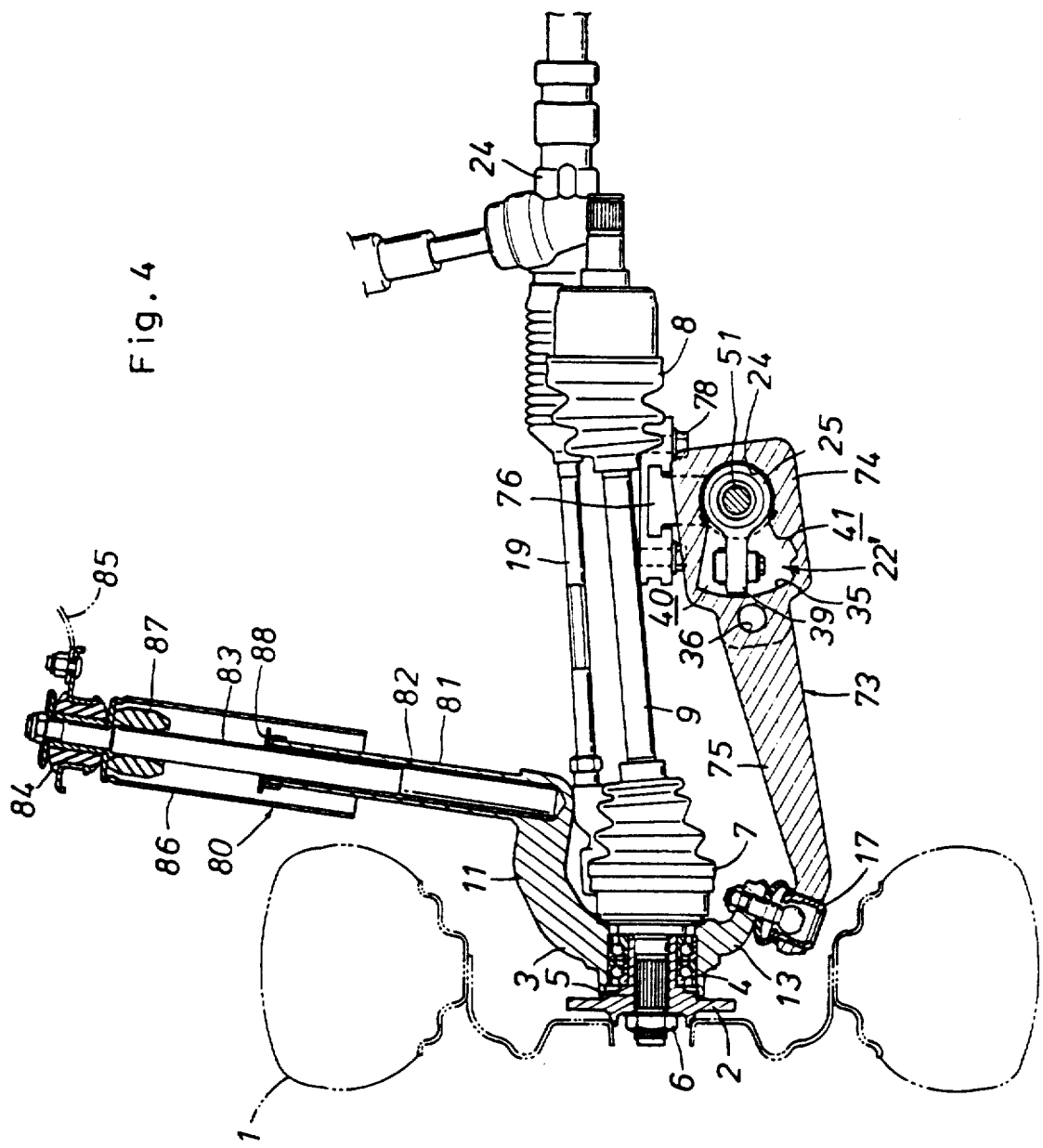
FIG. 4 is a sectional front view of a second embodiment of the suspension system according to the present invention as applied to a strut type suspension system.
Figure 5:
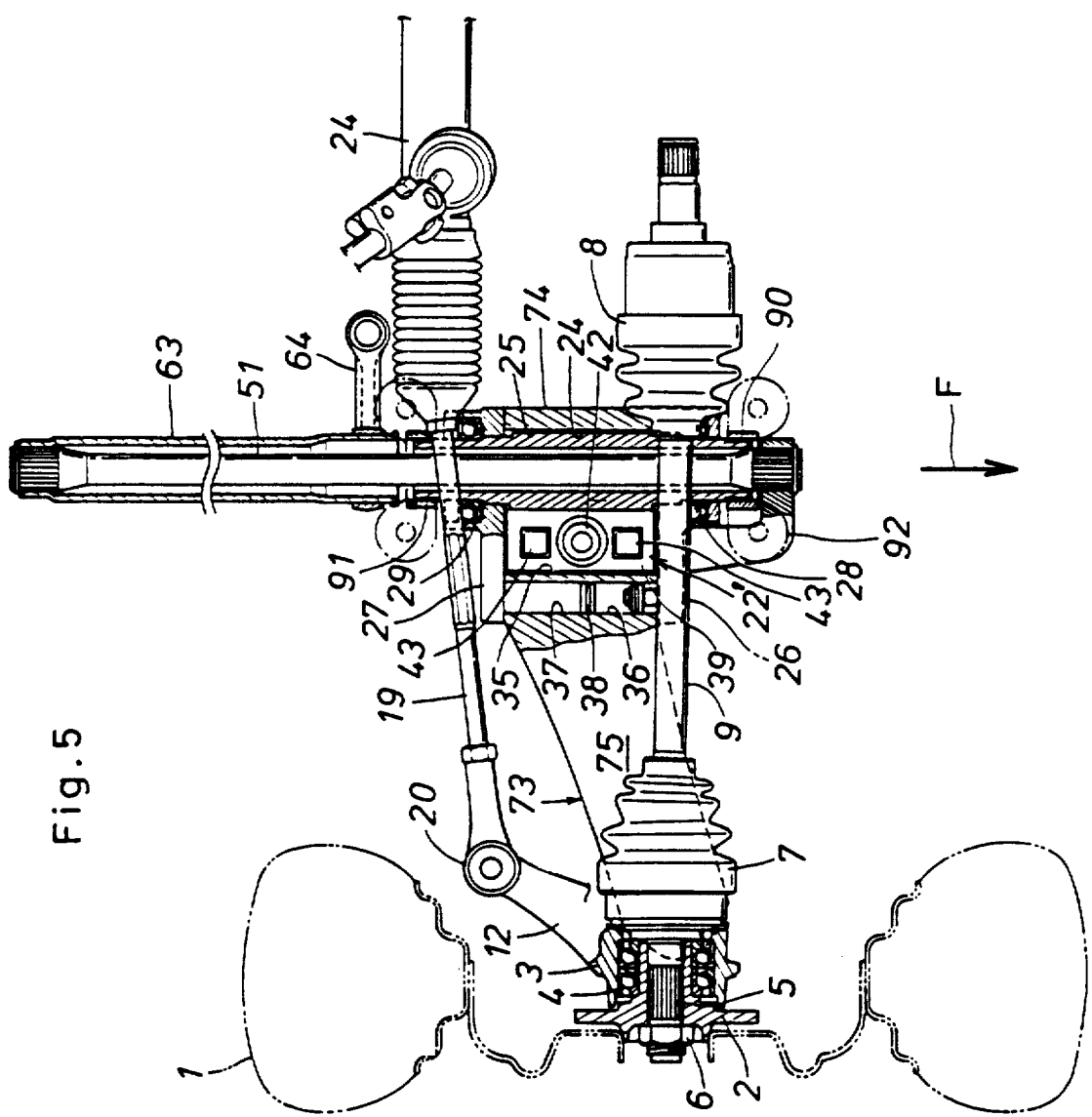
FIG. 5 is a sectional plan view of the second embodiment.
Figure 6:
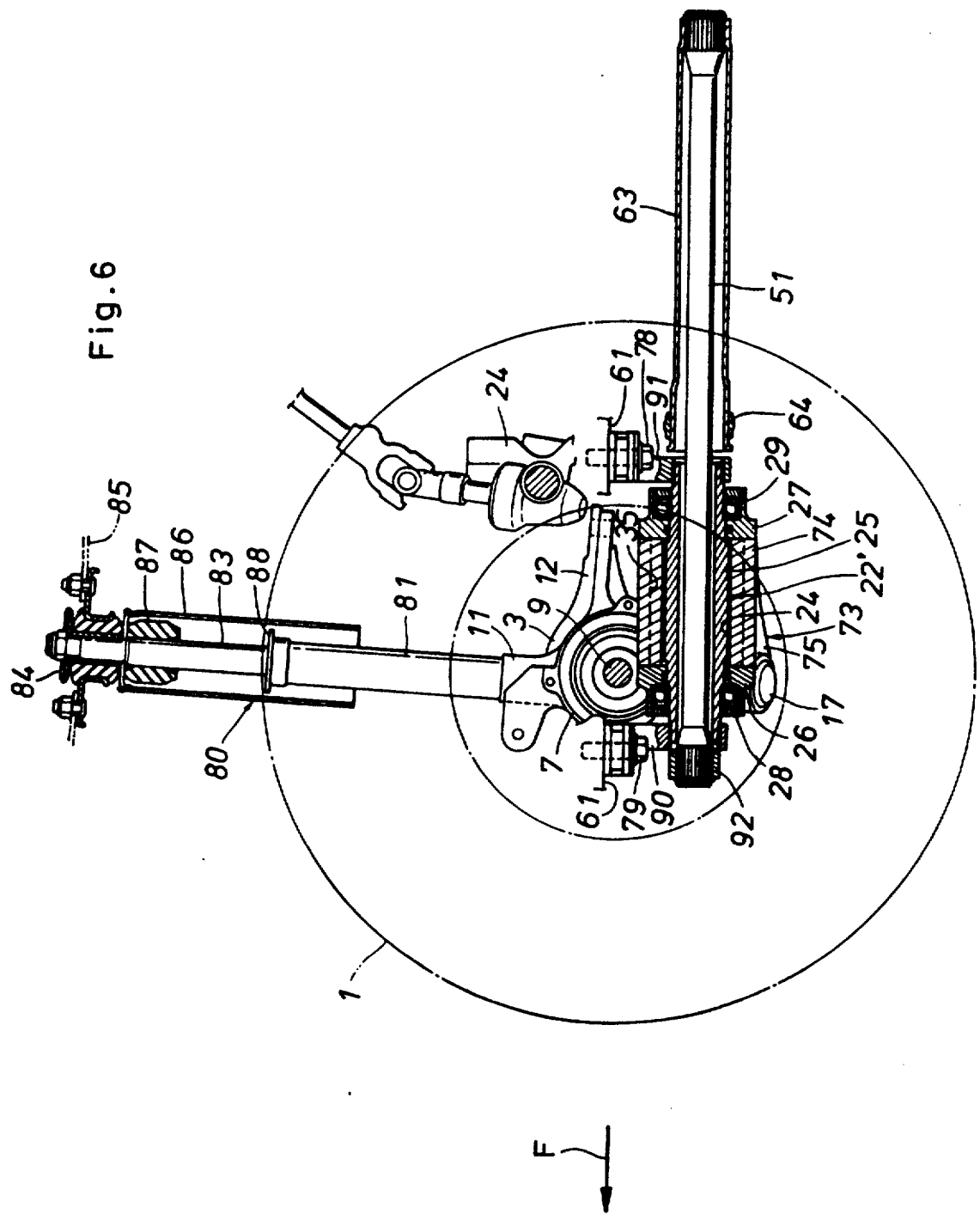
FIG. 6 is a sectional side view of the second embodiment.

FIGS. 4 through 6 show a second embodiment of the present invention which is constructed as a strut type suspension system. In these embodiments, like parts are denoted with like numerals, and description of identical parts is not necessarily repeated in the following disclosure.

The structure of the wheel carrier of this embodiment is similar to that of the preceding embodiment, and comprises a hub 2 rotatably supported in a central part of a knuckle 3 by means of a bearing 4, and an axle 5 secured by a nut 6 in the center of the hub 2 for integral rotation therewith by means of serration. The axle 5 is connected to an engine via universal joints 7 and 8, and a drive shaft 9.

The knuckle 3 is provided with three arms 11 through 13 extending upward, downward and rearward, respectively, and curving inwardly as required so as not to interfere with the front wheel 1. To the free end of the upper arm 11 is connected a strut unit 80 which vertically connects the knuckle 3 rotatably supporting the wheel 1 with the vehicle body. The strut unit 80 is provided with a hollow cylindrical strut 81 which is integrally formed at the free end of the upper arm 11. The strut 81 extends upward with a slight inclination to an inward and rearward direction. A liner 82 is press fitted into the inner circumferential surface of the strut 81, and receives a rod 83 therein so as to be slidable along the longitudinal direction or, in other words, into and out of the strut 81.

The upper end of the rod 83 extending from the strut 81 is provided with a mount portion 84, which is similar to a conventional mount portion, for securing the strut unit 80 to a vehicle body panel 85. To the lower side of the mount portion 84 is attached an outer tube 86 for protecting the part of the rod 83 extending out of the strut 81 as well as an upper part of the strut 81. A bump stop rubber 87 is secured to an internal part of the outer tube 86 to soften the impact and sound produced by a stopper 88 mounted on the upper end of the strut 81 when the wheel 1 is vigorously moved up and down.

The horizontal arm 12 of the knuckle 3 extending rearward is pivotally connected to the free end of a tie rod 24 extending from a steering gear box 23, by way of a ball joint 20. The free end of the lower arm 13 is connected to the free end of a lower swing arm 73 extending substantially laterally from the vehicle body, by way of a ball joint 17.

A base end 74 of the lower arm 73 is rotatably supported by the vehicle body so as to be able to move vertically, and incorporates a hydraulic rotary damper 22' therein. This rotary damper 22' is similar to the rotary damper 22 used in the preceding embodiment, but differs therefrom in that a torsion bar 51 is passed through the rotary damper 22', and is functionally coupled thereto as described hereinafter.

A swing portion 75 of the lower arm 73 is formed as a relatively wide horizontal plate extending rearwards in an oblique fashion from its free end pivotally connected to the lower arm 13 to its base end 74 pivotally connected to the vehicle body as best shown in FIG. 5.

The base end 74 is provided with a circular bore 24 extending along the fore-and-aft direction of the vehicle body, and a hollow shaft 25 of a substantially same diameter is passed, through this circular bore 24. End plates 26 and 27 are attached to the longitudinal ends of the base end 74, and the base end 74 is rotatably supported by the hollow shaft 25 by way of bearings 28 and 29 mounted to the end plates 26 and 27, respectively. The hollow shaft 25 is connected, by means of serration, to support members 90 and 91 at its longitudinal ends projecting from the end plates 26 and 27, respectively, and the support members 90 and 91 are fixedly secured to the vehicle body 61 by bolts 78 and 79, respectively. Thereby, the lower arm 73 can pivot vertically about the hollow shaft 25 as the wheel 1 moves vertically.

As described above, it is possible to eliminate the need for a radius rod by forming the swing portion 75 of the lower arm 73 with a wide planar member, and supporting the base end 74 at two points spaced from each other along the fore-and-aft direction of the vehicle body by way of a pair of bearings 28 and 29. It is also possible to rotatably support the base end 74 on the hollow shaft 25 by way of rubber bushes or the like instead of the bearings 28 and 29.

The rotary damper 22' is provided with an oil chamber 35 having the shape of a fan concentric to the circular bore 24 provided in the swing portion 75 side of the base end 74 in cross section. The oil chamber 35 is enclosed by the end plates 26 and 27 in a liquid tight manner, and its interior is filled with non-compressible oil such as silicone oil. The base end 74 is internally provided with a reserve chamber 36 next to the oil chamber 35, and the reserve chamber 36 is separated from a gas chamber 37 filled with nitrogen gas or the like by a free piston 38 on the one hand, and communicated with the oil chamber 35 by a passage not shown in the drawings. The interfaces between the hollow shaft 25 and the end plates 26 and 27 are sealed in a liquid tight manner.

The hollow shaft 25 is provided with a single vane 39 which extends horizontally from one side thereof into the interior of the oil chamber 35 and separates the oil chamber 35 into an upper chamber 40 and a lower chamber 41. The vane 39 is centrally provided with a valve 42 selectively communicating the upper chamber 40 with the lower chamber 41; this valve 42 opens itself according to the pressures of the two chambers. Further, the vane 39 is provided with a pair of rubber stoppers 43.

An elongated torsion bar 51 extending along the fore-and-aft direction of the vehicle body is passed through the hollow shaft 25. The torsion bar 51 is connected, by spline, to a free end of an L arm 92 extending forward from the front end plate 26 at its front end extending out of the front end of the hollow shaft 25. A torsion tube 63 is loosely fitted onto a rear end portion of the torsion bar 51 extending rearward out of the rear end of the hollow shaft 25 with respect to the vehicle body. The torsion tube 63 is connected to the rear end of the torsion bar 51 by serration at its rear end, and its front end is fixedly secured to the vehicle body by an anchor member 64. Therefore, the torsion bar 51 and the torsion tube 63 can undergo a twisting deformation around their axial line, thereby elastically supporting the wheel 1 by way of the lower arm 73.

Now the operation of the second embodiment of the suspension system according to the present invention described above is described in the following. As the vehicle travels over an irregular road surface and the wheel 1 moves up and down, the strut unit 80 guides the wheel 1 vertically with respect to the vehicle body with the rod 83 moving into and out of the strut 81 along its axial line. At the same time, the lower arm 73 moves vertically around its base end 74, thereby twisting the torsion bar 51 and the torsion tube 63 accordingly. The twisting elastic deformations of the torsion bar 51 and the torsion tube 63 elastically supports the vehicle body relative to the wheel.

Since the hollow shaft 25 is fixedly secured to the vehicle body, as the lower swing arm 73 pivots vertically about its base end 74, the vane 39 moves vertically in the oil chamber 35 in a relative sense. For instance, as the wheel moves upward, the lower chamber 41 is compressed, and the oil in the lower chamber 41 flows into the upper chamber 40 by passing through the gap between the inner circumferential surface of the oil chamber 35 and the vane 39. Further, once the pressure in the lower chamber 41 rises beyond a certain level, the valve 49 opens, and the oil flows from the lower chamber 41 into the upper chamber 40. The resistance to the flow of oil through this gap and the resistance due to the valve 42 produce a damping force. Conversely, as the wheel 1 moves downward, the upper chamber 40 is compressed, and the oil of the upper chamber 40 flows into the lower chamber 41. This likewise produces a damping force.

Thus, according to this embodiment, since the strut unit consists solely of a guide mechanism having only a strut and a rod for guiding the vertical movement of a wheel, a base end of a lower arm is provided with a rotary damper and is supported at two points spaced along the fore-and-aft direction of the vehicle body on either side of the rotary damper, and a torsion bar integrally connected to the lower arm is centrally passed through the rotary damper so that the need for a radius rod can be eliminated and the overall structure as well as the strut unit may be simplified and reduced in size, the space efficiency of the vehicle body and freedom in vehicle body design are improved, the center of gravity of the suspension system can be lowered through reduction of the weight of the strut unit, and the manufacturing cost can be reduced through reduction in the number of component parts.

Figure 7:
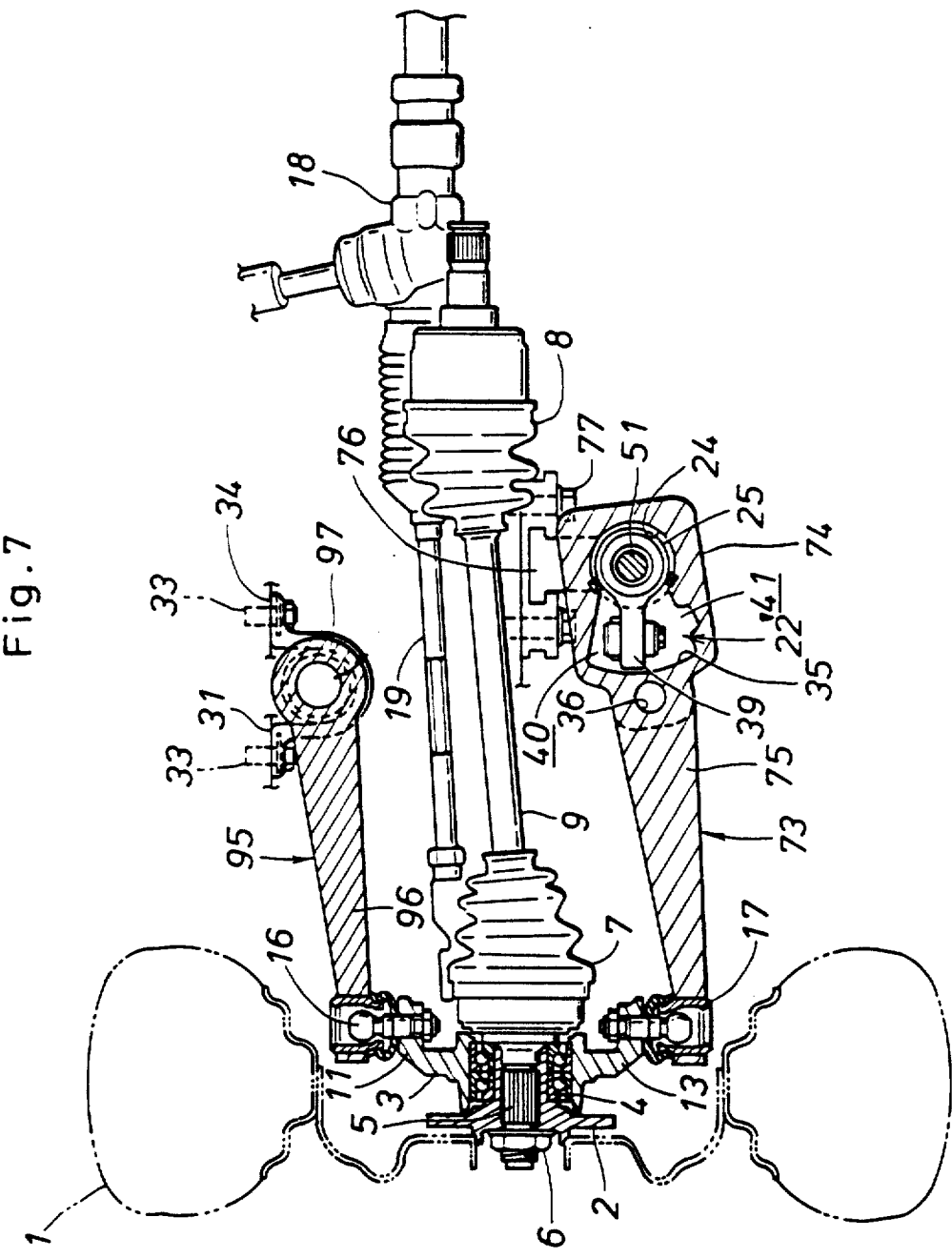
FIG. 7 is a view similar to FIG. 1 showing a third embodiment of the present invention as applied to a double wishbone type suspension system.

FIG. 7 shows a third embodiment of the present invention which is applied to a double wishbone suspension system. According to this embodiment, a rotary damper 22' and a torsion bar 51 are provided in its lower arm 73 whereas its upper swing arm 95 is constructed as a simple swing arm consisting of a base end 97 pivotally supported by the vehicle body 34 by way of a bracket 31 and threaded bolts 33, and a swing portion 96 whose free end is connected to the upper arm 11 of the wheel carrier by way of a ball joint 16.

According to this embodiment, since the upper swing arm 95 has an extremely simple structure, the suspension system interferes very little with the engine room or the passenger compartment of the vehicle. Further, since a large part of the weight of the suspension system is accounted by the lower swing arm equipped with a rotary damper and a suspension spring, the center of gravity can be set at a relatively low part of the vehicle body.

Figure 8:
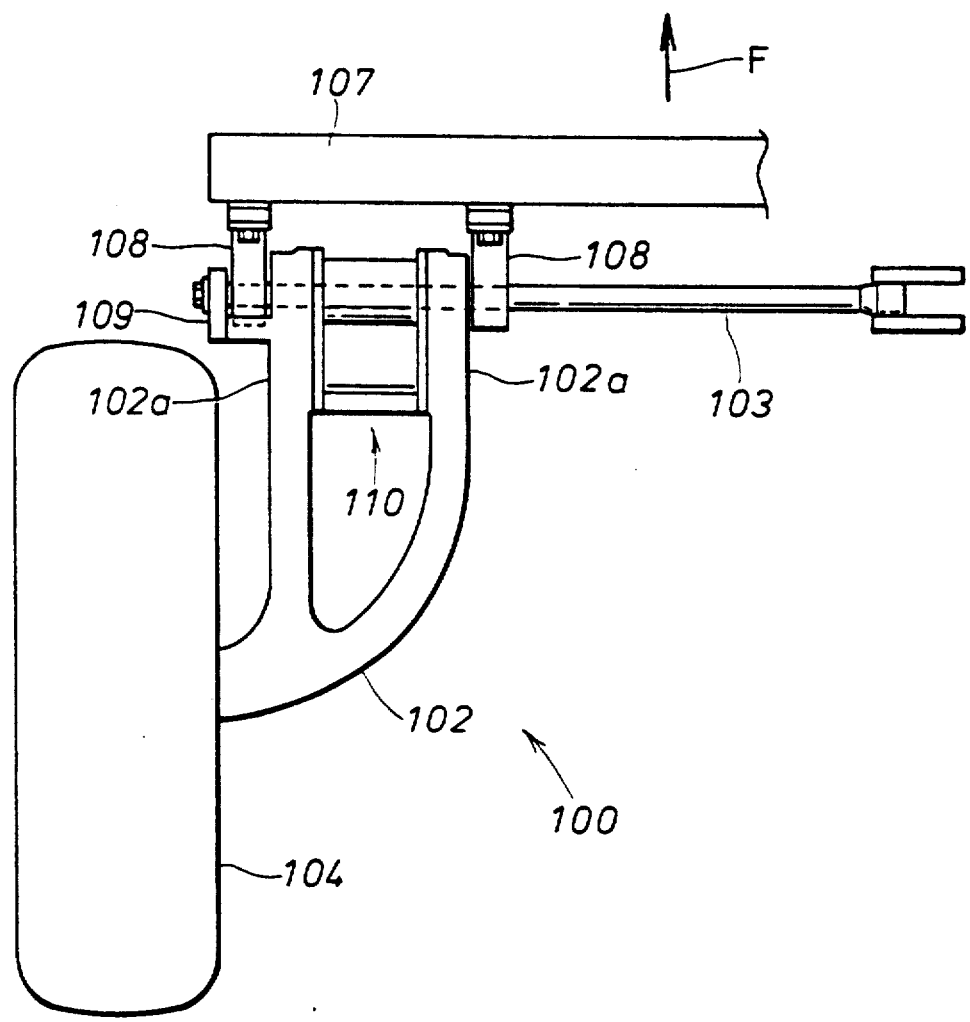
FIG. 8 is a simplified plan view showing a fourth embodiment of the present invention as applied to a trailing arm type suspension system.

FIG. 8 shows a fourth embodiment of the present invention applied to a trailing arm suspension system. This trailing arm suspension system 100 comprises a trailing arm 102 carrying a wheel 104 at its free end, and this trailing arm 102 is pivotally supported by a vehicle body 107 at its base end 102a around a pivot axis extending laterally of the vehicle body. In this case, a torsion bar 103 extending laterally of the vehicle body is rigidly connected to the vehicle body at its inner end and is pivotally supported by the vehicle body a pair of bearings 108 spaced from each other along the lateral direction of the vehicle body at its outer end. The base end 102a of the trailing arm 102 is provided with a rotary damper 110 which applies a damping force to the trailing arm 102. This rotary damper 110 may be similar in structure to any of the rotary dampers disclosed in this specification. The torsion bar 103 is coaxially passed through the center of this rotary damper 110, and its outermost end is rigidly connected to the base end 102a of the trailing arm 102 by an extension 109 thereof.

The specific embodiments of this invention described in this specification are intended to serve by way of example and are not a limitation on the scope of our invention. Numerous other embodiments of this invention will become apparent to those of ordinary skill in the art in light of the teachings of this specification.

What we claim is:

1. A vehicle suspension system, comprising:
   a suspension link mechanism including a swing arm pivotally supported by a part of a vehicle body at its base end and pivotally connected to a wheel carrier at its free end;
   spring means elastically supporting said swing arm relative to said vehicle body; and
   a rotary damper provided in said base end of said swing arm coaxially with a pivot center line of said base end of said swing arm to produce a damping force resisting a vertical swinging movement of said swing arm,
   said rotary damper comprising a casing defining a fluid chamber having a shape of a fan extending substantially toward a free end of said swing arm in cross section as seen in a plane perpendicular to a longitudinal line of said pivot center line, a central shaft centrally received in said casing, and a single vane extending laterally from said central shaft into said fluid chamber, said fluid chamber being filled with fluid for applying a damping force to said vane as said vane moves relative to said fluid chamber;
   said central shaft consisting of a hollow shaft fixedly secured to the vehicle body and extends centrally through said pivot center of said base end of said swing arm while said casing is formed in said base end of said swing arm;
   said spring means comprising a torsion bar extending through said hollow shaft and connected to said base end of said swing arm at its one end, and a torsion tube coaxially fitted onto said torsion bar in a radially spaced relationship and connected to the other end of said torsion bar at its one end and to the vehicle body at its other end.

2. A vehicle suspension system according to claim 1, wherein said swing arm equipped with said rotary damper is pivotally mounted on the vehicle body at two points which are spaced along a longitudinal direction of said pivot center line of said swing arm.

3. A vehicle suspension according to claim 1, wherein said link mechanism further comprises a strut unit pivotally connected to the vehicle body at an upper end of said strut and to an upper part of said wheel carrier at a second end of said strut, said strut unit consisting solely of telescopic guide means.

4. A vehicle suspension system according to claim 1, wherein said swing arm consists of a trailing arm having a pivot center extending at an angle to a fore-and-aft direction of said vehicle body.

5. A vehicle suspension system, comprising:
   a suspension link mechanism including a pair of swing arms which are vertically spaced from each other and extend substantially laterally of the vehicle body, each of said swing arms being pivotally supported by a part of a vehicle body at its base end and pivotally connected to a wheel carrier at its free end;
   a rotary damper provided in said base end of an upper one of said swing arms coaxially with a pivot center line of said base end of said upper swing arm to produce a damping force resisting a vertical swinging movement of said upper swing arm; and
   spring means elastically supporting a lower one of said swing arms, said spring means comprising a torsion bar extending coaxially with said pivot center line of said lower swing arm and connected to said base end of said lower swing arm at its one end, and a torsion tube coaxially fitted onto said torsion bar in a radially spaced relationship and connected to the other end of said torsion bar at its one end and to the vehicle body at its other end.

6. A vehicle suspension system according to claim 5, wherein the length of said upper swing arm is less than the length of said lower swing arm as measured along a lateral direction of the vehicle.

7. A vehicle suspension system according to claim 5, wherein said swing arm equipped with said rotary damper is pivotally mounted on the vehicle body at two points which are spaced along a longitudinal direction of said pivot center line of said swing arm.

* * * * *